United States Patent
Anathanam et al.

(10) Patent No.: US 11,810,043 B1
(45) Date of Patent: Nov. 7, 2023

(54) TWO FOLD VALIDATION FOR HIERARCHICAL DATA MODELS

(71) Applicant: Workday, Inc., Pleasanton, CA (US)

(72) Inventors: Anand Anathanam, Munich (DE); Ajay Sagar, Munich (DE); Katherine Lahl, Danville, CA (US); John Paul Nguafack, Munich (DE)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 17/069,457

(22) Filed: Oct. 13, 2020

(51) Int. Cl.
   *G06Q 10/067* (2023.01)
   *G06F 16/248* (2019.01)
   *G06Q 10/10* (2023.01)
   *G06F 16/28* (2019.01)

(52) U.S. Cl.
   CPC ......... *G06Q 10/067* (2013.01); *G06F 16/248* (2019.01); *G06F 16/282* (2019.01); *G06Q 10/103* (2013.01)

(58) Field of Classification Search
   CPC .. G06Q 10/067; G06Q 10/103; G06F 16/282; G06F 16/248
   See application file for complete search history.

(56) References Cited

U.S. PATENT DOCUMENTS

| | | | | |
|---|---|---|---|---|
| 5,829,003 A * | 10/1998 | Okura | ................. | G06Q 10/067 |
| 6,147,687 A * | 11/2000 | Wanderski | ............ | G06F 3/0481 715/853 |
| 6,249,905 B1 * | 6/2001 | Yoshida | .................... | G06F 8/24 717/121 |
| 6,681,370 B2 * | 1/2004 | Gounares | .............. | G06F 40/154 715/238 |
| 6,795,096 B2 * | 9/2004 | Meaden | ................ | G06F 3/0481 715/764 |
| 8,170,966 B1 * | 5/2012 | Musat | ................... | H04L 51/212 706/14 |
| 10,230,585 B1 * | 3/2019 | A | ............................ | H04L 67/34 |
| 2007/0143336 A1 * | 6/2007 | Lindley | ................ | G06Q 10/067 707/999.102 |
| 2008/0082539 A1 * | 4/2008 | Doane | ..................... | H04L 67/34 |
| 2009/0006427 A1 * | 1/2009 | Veeraraghavan | ... | G06F 3/04845 |
| 2013/0332891 A1 * | 12/2013 | Schmitlin | ............. | G06Q 10/10 715/853 |

(Continued)

OTHER PUBLICATIONS

Pawlik, Mateusz, and Nikolaus Augsten. "RTED: a robust algorithm for the tree edit distance." arXiv preprint arXiv:1201.0230 (2011). (Year: 2011).*

(Continued)

*Primary Examiner* — Andrew T Chiusano
(74) *Attorney, Agent, or Firm* — Van Pelt, Yi & James LLP

(57) ABSTRACT

A system comprises an interface and a processor. The interface is configured to receive an indication to execute a proposed organization chart. The processor is configured to determine a valid net action queue for the proposed organization chart. Determining the valid net action queue comprises scanning an action queue to add actions to the valid net action queue in response to the actions being valid in relation to an organization chart stored in a database. The processor is further configured to apply the valid net action queue to the organization chart to obtain the proposed organization chart and execute the proposed organization chart to create a new organization chart.

20 Claims, 15 Drawing Sheets

(56) References Cited

U.S. PATENT DOCUMENTS

2016/0054894 A1 2/2016 Zhang
2016/0217424 A1 7/2016 Challenger
2017/0308602 A1* 10/2017 Raghunathan .......... G06F 16/27
2018/0137447 A1 5/2018 Kaseda

OTHER PUBLICATIONS

Bille, Philip. "A survey on tree edit distance and related problems." Theoretical computer science 337.1-3 (2005): 217-239. (Year: 2005).*
J. D. Newman "Self help: The OAMS; a data mart to support information technology operations". Intelligent Enterprise, 5(16), 30(5). (Year: 2002).

* cited by examiner

| ID | Action | Instance | From | To |
|----|--------|----------|------|-----|
| t1 | Change Manager | Ginny | Cleo | Doug |
| t2 | Change Manager | Earnest | Cleo | Doug |
| t3 | Change Name | Cleo | | Cleopatra |

TWO FOLD VALIDATION FOR HIERARCHICAL DATA MODELS

BACKGROUND OF THE INVENTION

A system for organizational planning comprises a system for displaying a hierarchical data model—for example, an organizational chart displaying a set of employees of a company arranged by management hierarchy. For some companies, the management hierarchy is very large, comprising hundreds of thousands or even millions of employees. A human resources manager planning a potential reorganization desires to experiment with the organizational chart, rearranging or modifying entities in order to visualize the effect of different changes on the overall structure. For large companies, making a full copy of the organizational chart for experimentation can consume a large amount of computational resources, and making many copies in order to try different changes can be computationally intractable especially for use of memory.

BRIEF DESCRIPTION OF THE DRAWINGS

Various embodiments of the invention are disclosed in the following detailed description and the accompanying drawings.

FIG. 3C is a diagram illustrating an embodiment of an action queue.

DETAILED DESCRIPTION

Figure 1:
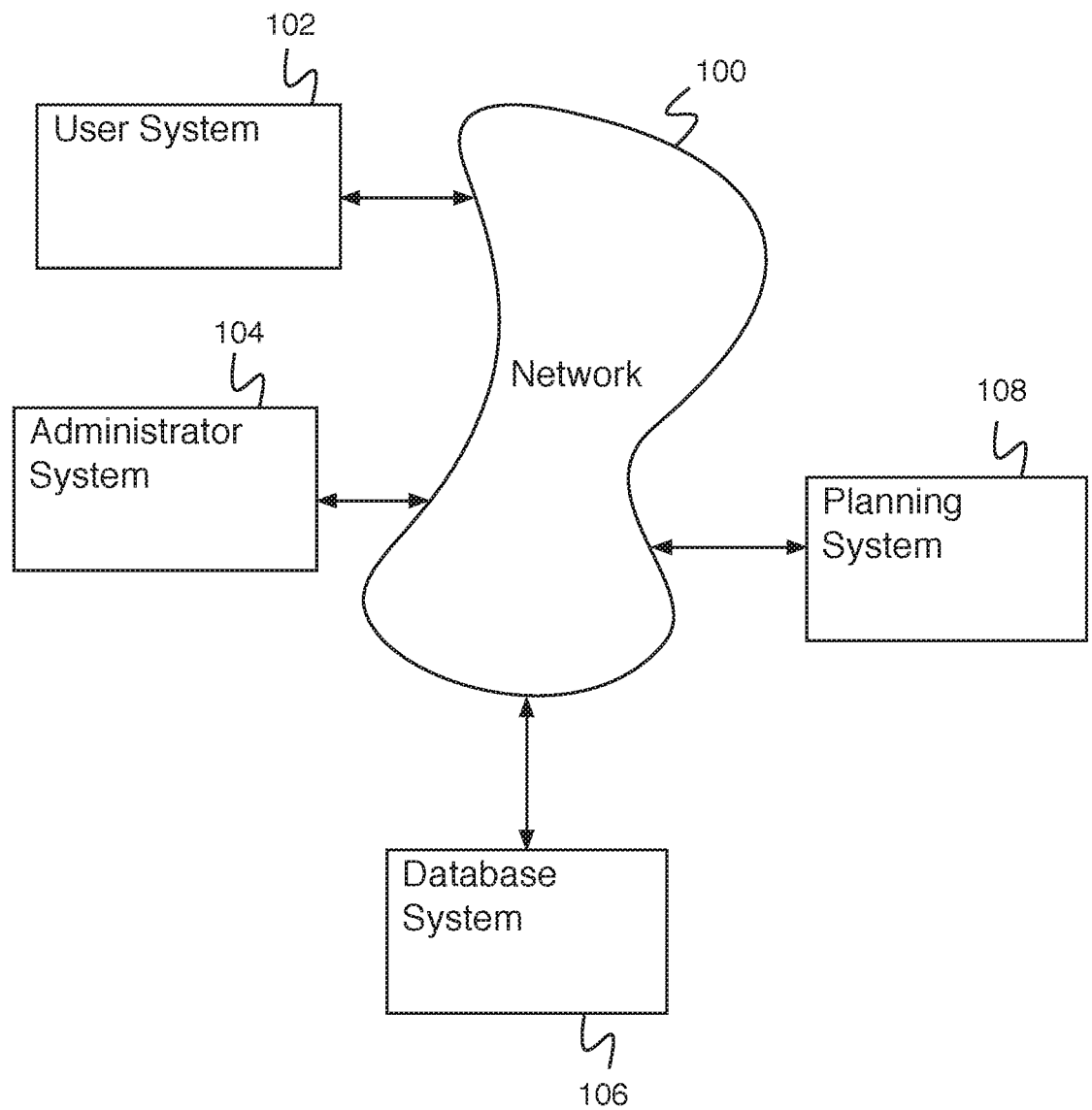
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for hierarchical data models is disclosed. The system comprises an interface, a processor, and a memory. The interface is configured to receive an indication to render a proposed organization chart. The processor is configured to determine a net action queue for the proposed organization chart, wherein determining the net action queue comprises scanning an action queue to consolidate actions for the net action queue, apply the net action queue to an original organization chart to obtain the proposed organization chart, and render the proposed organization chart. The memory is coupled to the processor and configured to provide the processor with instructions.

A system for hierarchical data models is disclosed. The system comprises an interface, a processor, and a memory. The interface is configured to receive an indication to execute a proposed organization chart. The processor is configured to determine a valid net action queue for the proposed organization chart, wherein determining the valid net action queue comprises scanning an action queue to add actions to the valid net action queue in response to the actions being valid in relation to an organization chart stored in a database, apply the valid net action queue to the organization chart to obtain the proposed organization chart, and execute the proposed organization chart to create a new organization chart. The memory is coupled to the processor and configured to provide the processor with instructions.

A system for multiple versioning for hierarchical data models comprises a system for efficiently allowing scenario experimentation for hierarchy reorganization. For example, trying out different configurations for reorganization of a company. In a system maintaining a large hierarchy, making copies of the hierarchy for experimental reorganization is not practical, as the hierarchy may have as many as hundreds of thousands or even millions of nodes. The system addresses this problem by storing an experimental version of an organization chart as a set of changes made to an original or stored organization chart. Each change made by a planning user is stored in an action queue. The set of changes stored in the action queue is small compared to the full hierarchy and can be stored in memory for fast access and processing, and multiple versions can be created corresponding to different planning experiments. An action queue corresponding to a desirable experiment can be stored in long-term storage for access at a later time, or replayed onto the original or stored organization chart to cause the changes to take effect. In response to a user indication to render a proposed organization chart (e.g., to display a proposed organization chart from a previous editing session, for viewing and/or for further editing), the system first determines a net action queue for the proposed organization chart. Determining the net action queue comprises scanning the action queue for the proposed organization chart, to consolidate actions for the net action queue. For example, as a planning user develops the proposed organization chart, all changes are stored, and some changes can supersede other changes or be redundant from other changes. For instance, an employee may be moved from a first manager to a second manager then to a third manager (e.g., so the net action is to move the employee from the first manager to the third manager), or a group may have its name changed multiple times (e.g., so the net action is to change from first name to the last name). Scanning the action queue to consolidate actions for the net action queue comprises determining the minimal set of changes indicated by the action queue. The changes are stored in memory as the net changes for each entity of a subset of entities of the original organization chart. These changes are then applied to the entities of the original or stored organization chart to create the proposed organization chart. The proposed organization chart is then rendered. In some embodiments, rendering the proposed organization chart is accelerated by determining a location associated with each entity of the proposed organization chart, determining a display area for the proposed organization chart, and determining a rendering subset comprising proposed organization chart entities with a rendering location within the display area. A set of rendering images comprising a rendering image for each proposed organization chart of the rendering subset is determined and provided for rendering. The system improves the computer by allowing experimental versions of a large hierarchical data model to be created, displayed, edited, and stored, without the overhead of creating additional copies of the data model.

A system for executing a proposed organization chart comprises a system for validating a stored action queue. Because the system for multiple versioning for hierarchical data models stores a proposed organization chart as a set of changes applied to an original organization chart, a problem can occur when the original organization chart changes. For example, the original organization chart comprises an in-use operational organization chart that undergoes changes according to business demand. A stored action queue may comprise actions that were valid at the time the action queue was created—however, because of changes to the original organization chart, the stored action(s) are no longer valid. When the system for executing a proposed organization chart recalls an action queue for a proposed organization chart, prior to executing the changes of the action queue, a valid net action queue is determined, wherein the valid net action queue comprises actions of the action queue after validation and consolidation. Validating actions of the action queue comprises validating the actions in relation to the stored organization chart (e.g., the currently active organization chart). For example, consider the following action queue: [ . . . , A1, . . . , A2 . . . ], where A1 is "Create Org Y under Org X" and A2 is "Move Worker W into (newly created) Org Y". After the user has made these changes, someone could inactivate Org X in the original database, which makes A1 invalid (e.g., you cannot create new orgs under an inactive organization). So the change in the original database has only directly impacted A1. However, the failure of A1 to execute will impact A2 as well, since there will be no new Org Y into which Worker W can be moved. Therefore the reality is that the change in the original database has impacted A1 directly and A2 indirectly as A2 depends on A1. The system is able to detect this because once it is determined that A1 is in error, it is not applied to the overall changes tracked by the net action queue, and similarly, A2 will also not be applied to the net action queue once it's determined to be in error. This allows the to accurately determine cascading errors in actions without the need for any additional validation logic. In various embodiments, validating actions comprises a currently invalid action, a cascading invalid action (e.g., due to stemming from another invalid action), or any other appropriate invalid action.

In the event an action is determined to not be valid, the action is added to an error list. In the event an action is determined to be valid, the action is consolidated and added to a valid net action queue. The valid net action queue is then applied to the organization chart to determine a proposed organization chart. A rendering of the proposed organization chart is provided for user validation. User validation is necessary because of the possibility of undesired effects resulting from underlying changes to the stored organization chart. In addition, it is possible that errors are created by underlying changes to the stored organization chart that are not fatal to the execution of the proposed organization chart, and the user decides to proceed with execution despite the errors. After the proposed organization chart is rendered, the user is prompted for a go indication (e.g., an indication to execute the proposed organization chart) or a no-go indication (e.g., an indication not to execute the proposed organization chart). In the event the system receives a go indication, execution of the proposed organization chart proceeds. In the event the system receives a no-go indication, processing ends prior to execution of the proposed organization chart. Execution of the proposed organization chart comprises executing the valid net action queue to the organization chart stored in the database (e.g., causing the changes of the valid net action queue to take effect in the database). The system for executing a proposed organization chart improves the computer by identifying invalid actions of a stored action queue prior to applying the stored action queue to a stored organization chart. Use of this validation step is necessary to make a system for multiple versioning for hierarchical data models practical, given the possibility of changes to the underlying organization chart prior to execution of the proposed organization chart but after design of the proposed organization chart.

The system improves the computer by making more efficient use of memory by making it possible and practical to store one or more scenario hierarchies. In addition, the display processing is reduced by only rendering a portion of a hierarchy according to a windowing of the display. Also, the system improves the computer by enabling handling of changes to a hierarchy from which actions in an action list stem from. Consolidation of an action list improves computation efficiency for rendering and for execution at a later time of a scenario. Validation also improves computation efficiency in that any changes that are made inappropriate are not performed and logged and/or displayed for a user at the time of rendering or execution.

FIG. 1 is a block diagram illustrating an embodiment of a network system. In some embodiments, the network system of FIG. 1 comprises a network system for a system for planning. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, database system 106, and planning system 108 communicate via network 100.

User system 102 comprises a user system for use by a user. For example, user system 102 comprises a system for communication, data access, computation, etc. A user uses user system 102 to access database system 106. For example, a user uses user system 102 to access human resources database data on database system 106, a user uses user system 102 to access financial database data on database system 106, a user uses user system 102 to access an organizational structure on database system 106, a user uses user system 102 to modify data on database system 106, a user uses user system 102 to delete data on database system 106, etc. A user additionally uses user system 102 to access planning system 108, either directly or via database system 106.

A user uses planning system 106 to create a proposed organization chart (e.g., a projection of future data based at least in part on data of database system 106), to view a proposed organization chart, to compare multiple proposed organization charts, etc. Administrator system 104 comprises an administrator system for use by an administrator. For example, administrator system 104 comprises a system for communication, data access, computation, etc. An administrator uses administrator system 104 to maintain database system 106. For example, an administrator uses administrator system 104 to start and/or stop services on database system 106, to reboot database system 106, to install software on database system 106, to add, modify, and/or remove data on database system 106, etc. Database system 106 comprises a database system for storing data. For example, database system 106 comprises a database system for storing data in a table-based data structure, an object-based data structure, etc. Database system 106 comprises a business database system, a human resources database system, an organizational structure, a financial database system, a university database system, a medical database system, a manufacturing database system, etc. Planning system 108 comprises a system for creating a proposed organization chart or a set of proposed organization charts based at least in part on data of database system 106. A proposed organization chart comprises a proposed modification of an organization chart stored on database system 106 (e.g., including changes comprising moving entities, adding entities, deleting entities, modifying entities, etc.).

For example, planning system 108 comprises an interface configured to receive an indication to render a proposed organization chart, a processor configured to determine a net action queue for the proposed organization chart, wherein determining the net action queue comprises scanning an action queue to consolidate actions for the net action queue, apply the net action queue to an original organization chart to obtain the proposed organization chart, and render the proposed organization chart, and a memory coupled to the processor and configured to provide the processor with instructions.

For example, planning system 108 additionally comprises an interface configured to receive an indication to execute a proposed organization chart, a processor configured to determine a valid net action queue for the proposed organization chart, wherein determining the valid net action queue comprises scanning an action queue to add actions to the valid net action queue in response to the actions being valid in relation to an organization chart stored in a database, apply the valid net action queue to the organization chart to obtain the proposed organization chart, and execute the proposed organization chart to create a new organization chart, and a memory coupled to the processor and configured to provide the processor with instructions.

Figure 2:
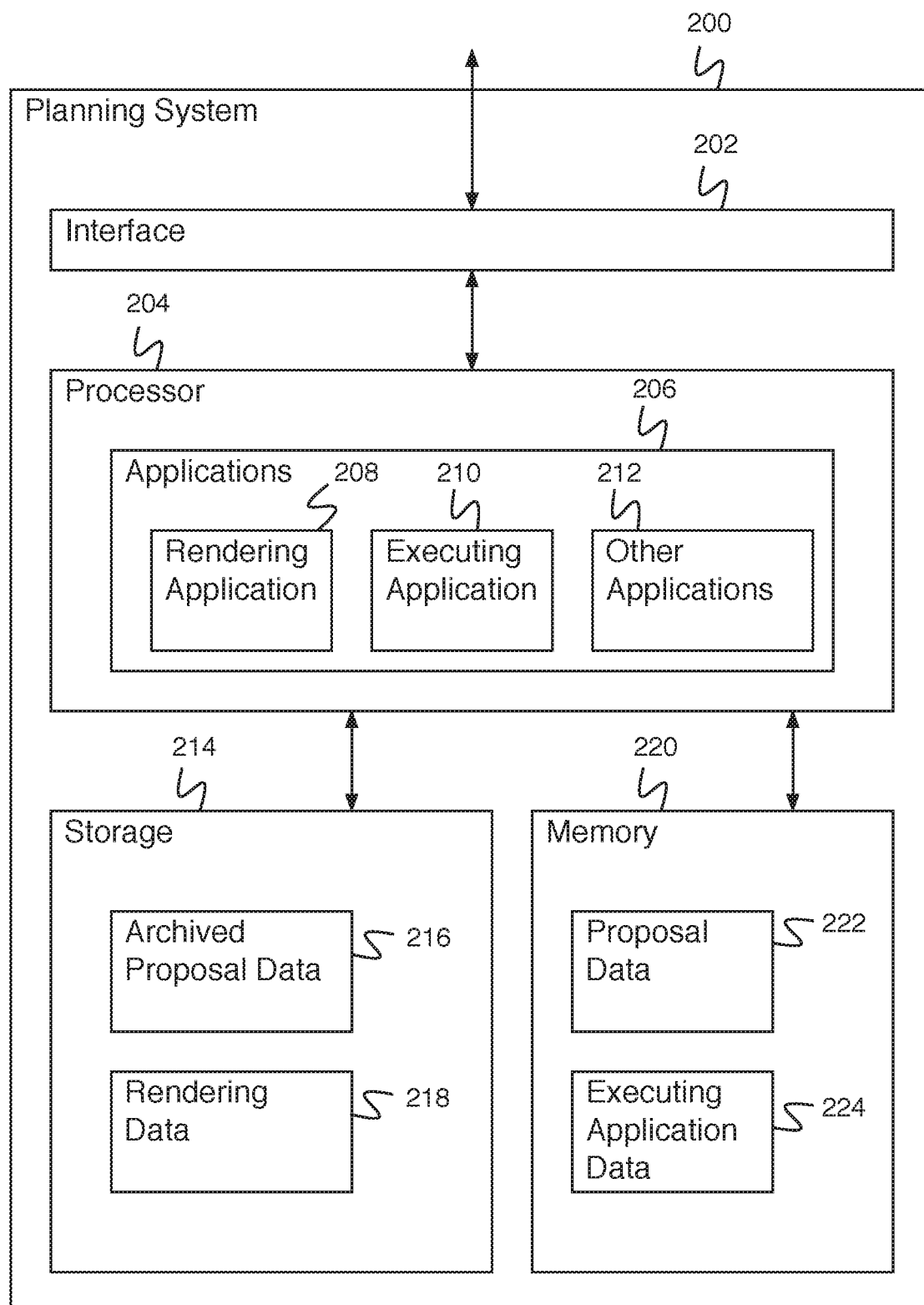
FIG. 2 is a block diagram illustrating an embodiment of a planning system.

FIG. 2 is a block diagram illustrating an embodiment of a planning system. In some embodiments, planning system 200 comprises planning system 108 of FIG. 1. In the example shown, planning system 200 comprises interface 202. For example, interface 202 comprises an interface for receiving data, providing data, receiving proposed organization chart data, receiving a request to render a proposed organization chart, receiving a request to execute a proposed organization chart, etc. Processor 204 comprises a processor for executing applications 206. Applications 206 comprise rendering application 208, executing application 210, and other applications 212. Rendering application 208 comprises an application for rendering a proposed organization chart. For example, rendering application 208 comprises an interactive application for receiving proposed changes to an organizational chart, validating the changes, and providing a rendered version of the proposed organizational chart for display. In some embodiments, rendering application 208 comprises an application for determining a net action queue for a proposed organization chart, wherein determining the net action queue comprises scanning an action queue to consolidate actions for the net action queue, applying the net action queue to an original organization chart to obtain the proposed organization chart, and rendering the proposed organization chart. Executing application 210 comprises an application for accessing an action queue in response to an indication to execute a proposed organization chart. For example, executing application 210 comprises an application for performing a validation to determine whether the actions of the action queue are still valid, creating and rendering the proposed organization chart in order to provide an indication of the state of the proposed organization chart to the requesting user, providing an error list to the requesting user in the event that one or more actions of the action queue are not valid, receiving an indication from the user to execute the proposed organization chart or to not execute the proposed organization chart, and executing the proposed organization chart in response to an indication from the user to execute the proposed organization chart. In some embodiments, executing application 210 comprises an application for determining a valid net action queue for a proposed organization chart, wherein determining the valid net action queue comprises scanning an action queue to add actions to the valid net action queue in response to the actions being valid in relation to an organization chart stored in a database, apply the valid net action queue to obtain the proposed organization chart, and execute the proposed organization chart to create a new organization chart. Other applications 212 comprises any other appropriate applications (e.g., a communications application, a chat application, a web browser application, a document preparation application, a report preparation application, a user interface application, a data analysis application, etc.). Storage 214 comprises archived proposal data 216 (e.g., a stored action queue created using rendering application 208 and stored in storage 214 for later access, comprising a set of organization chart actions) and stored rendering data 218 (e.g., a set of rendering data associated with organization chart elements used for creating a rendering of an organization chart). Memory 220 comprises proposal data 222 comprising active proposal data used by rendering application 208 and executing application 210. For example, proposal data 222 comprises an action queue, a net action queue, a valid net action queue, and/or a proposed organization chart. Memory 220 additionally comprises executing application data 224 comprising additional data associated with applications 206.

Figure 3A:
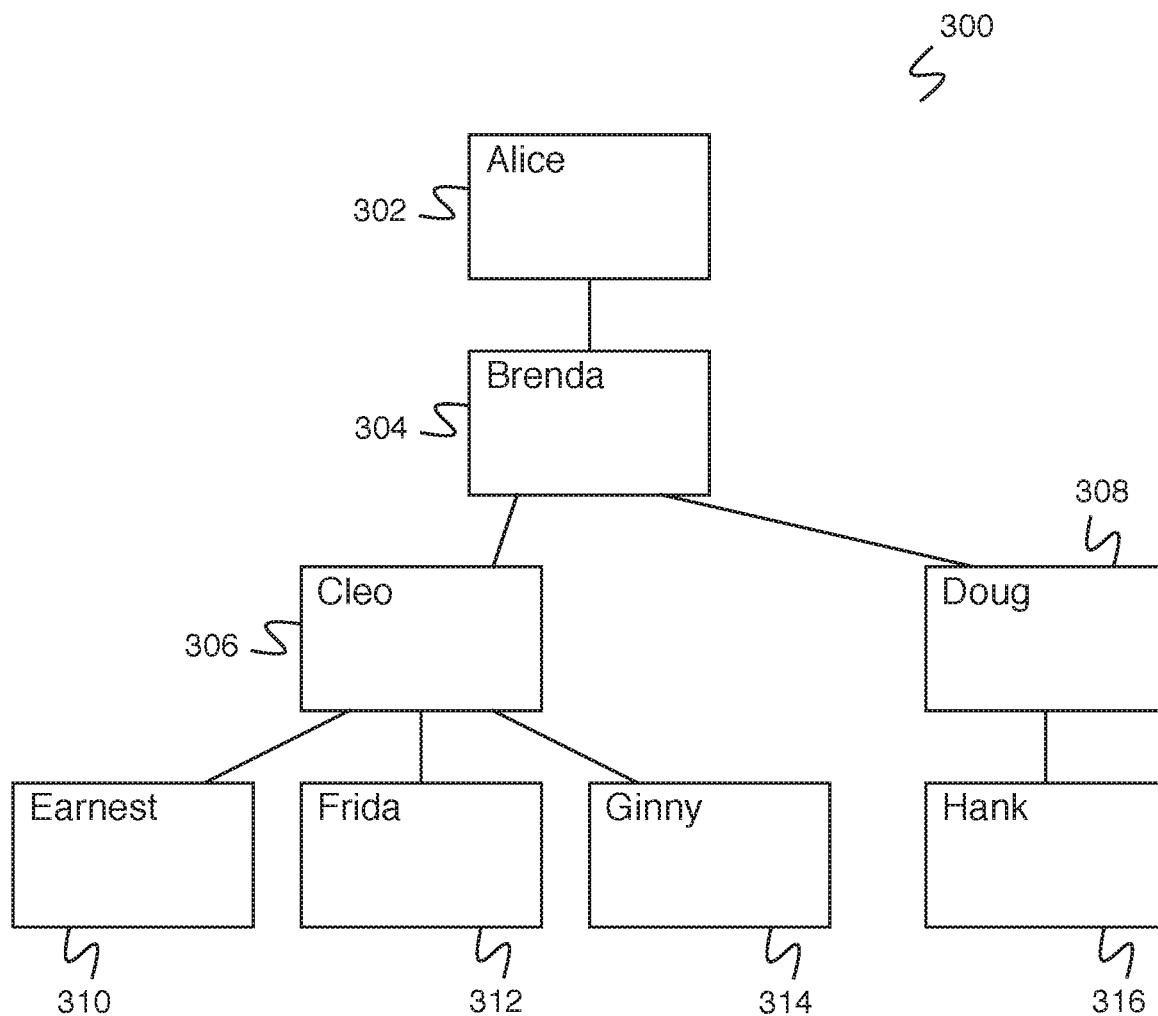
FIG. 3A is a diagram illustrating an embodiment of an organization chart.

FIG. 3A is a diagram illustrating an embodiment of an organization chart. In some embodiments, organization chart 300 comprises an organization chart stored by database system 106 of FIG. 1. In the example shown, organization chart 300 comprises 8 organization chart elements, each element representing an employee of a company. Element 302 comprises employee Alice, at the top of the hierarchy, directly supervising Brenda, represented by element 304. Brenda supervises Cleo, represented by element 306, and Doug, represented by element 308. Cleo supervises Earnest (represented by element 310), Frida (represented by element 312), and Ginny (represented by element 314). Doug supervises Hank, represented by element 316. A user (e.g., using user system 102 of FIG. 1 in communication with planning system 108 of FIG. 1) can use a system for multiple versioning for hierarchical data models to experiment with potential modifications of organizational chart 300, store potential modifications of organization chart 300, recall potential modifications of organizational chart 300, render potential modifications of organizational chart 300, validate potential modifications of organizational chart 300, execute potential modifications of organizational chart 300, etc.

Figure 3B:
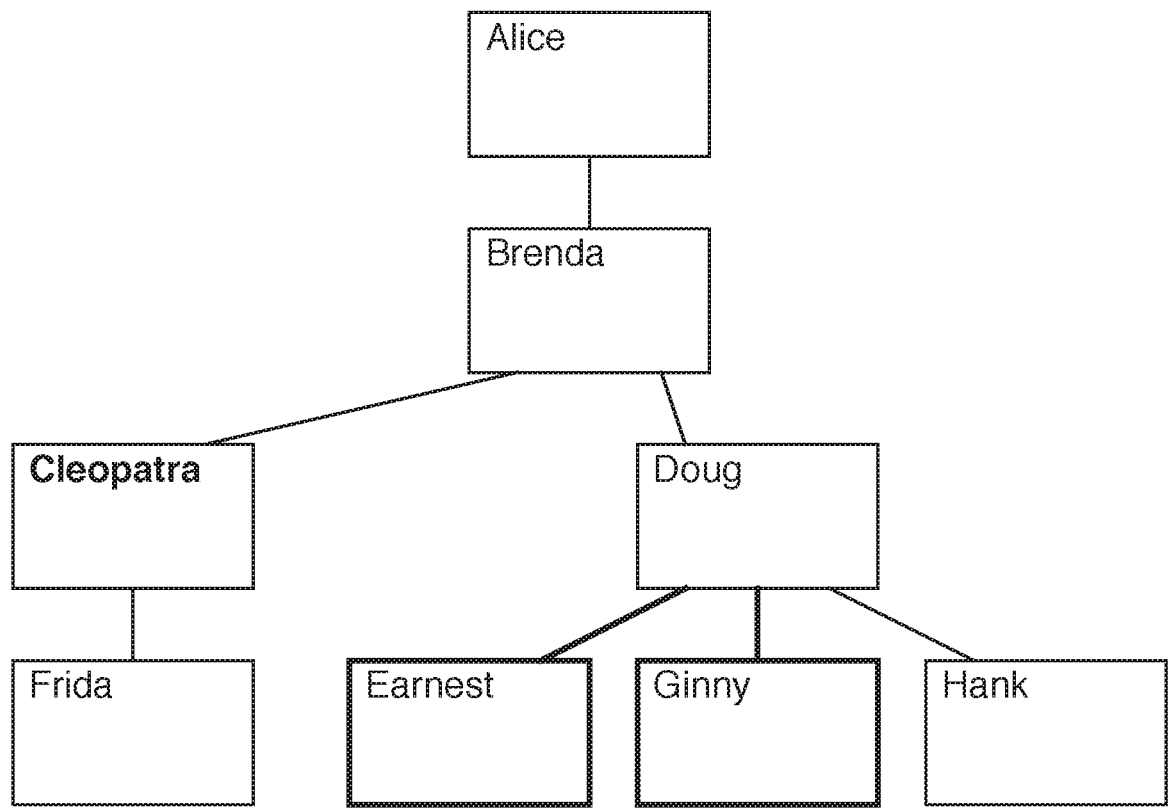
FIG. 3B is a diagram illustrating an embodiment of proposed changes to an organization chart.

FIG. 3B is a diagram illustrating an embodiment of proposed changes to an organization chart. In some embodiments, organization chart 320 comprises organization chart 300 of FIG. 3A having undergone a proposed set of changes. In the example shown, employee Earnest and employee have been moved (e.g., by a user) from under the supervision of Cleo to under the supervision of Doug. In addition, Cleo's name has been modified to Cleopatra. For example, the proposed set of changes is stored by a planning system (e.g., planning system 108 of FIG. 1) as an action queue modifying an original organization chart (e.g., organization chart 300 of FIG. 3) stored by a database system (e.g., database system 106 of FIG. 1).

FIG. 3C is a diagram illustrating an embodiment of an action queue. In some embodiments, the action queue of FIG. 3C comprises a queue indicating changes shown in organization chart 320 of FIG. 3B. In the example shown, action queue 340 comprises three actions. Action t1 comprises a change manager action, moving Ginny from Cleo to Doug; action t2 comprises a change manager action, moving Earnest from Cleo to Doug; and action t3 comprises a change name action, changing Cleo's name to Cleopatra.

Figure 4A:
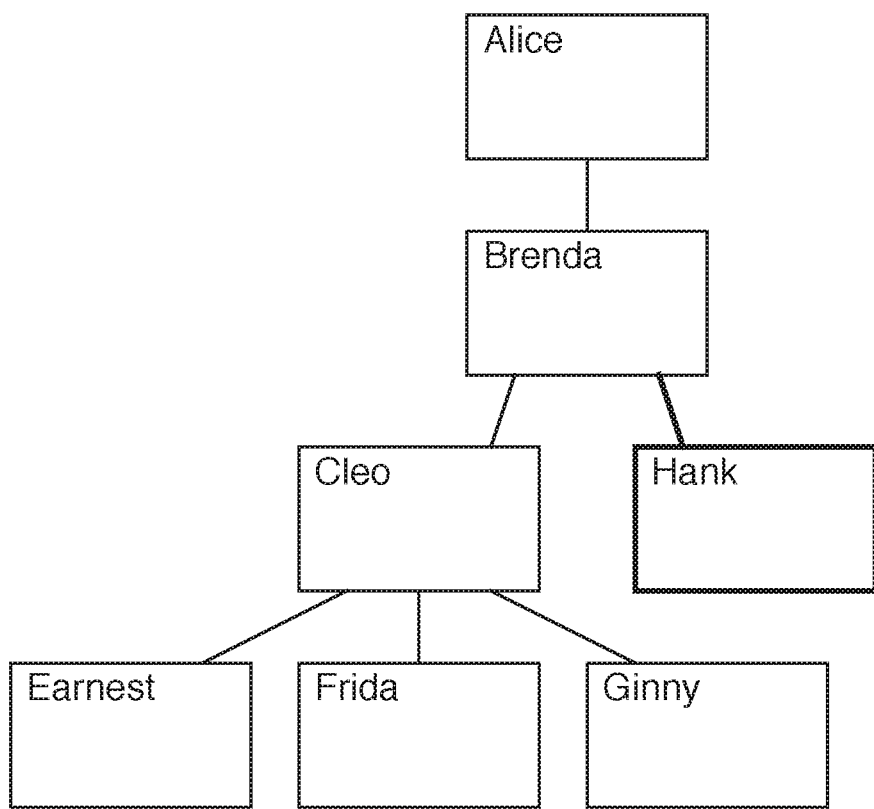
FIG. 4A is a diagram illustrating an embodiment of an underlying change to an organization chart.

FIG. 4A is a diagram illustrating an embodiment of an underlying change to an organization chart. In some embodiments, organization chart 400 comprises organization chart 300 of FIG. 3A having undergone a change. For example, the change comprises a change made by system administrator using administrator system 104 of FIG. 1 or a user using user system 102 of FIG. 1, interacting with database system 106 of FIG. 1. In the example shown, employee Doug is removed from the organization chart. Employee Hank is moved to be supervised by employee Brenda. For example, the proposed changes comprise changes to an organization database stored by database system 106.

Figure 4B:
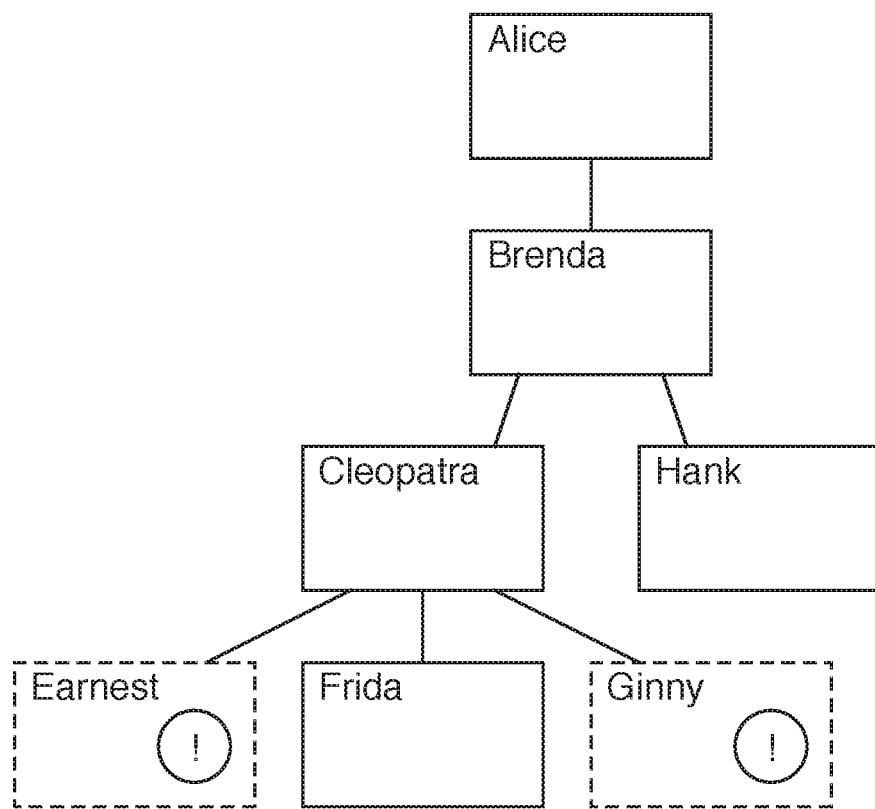
FIG. 4B is a diagram illustrating an embodiment of an action queue error.

FIG. 4B is a diagram illustrating an embodiment of an action queue error. In some embodiments, organization chart 420 comprises organization chart 400 of FIG. 4A after application of the changes in action queue 340 of FIG. 3C. In the example shown, an attempt is made to move Earnest and Ginny under supervision of Doug. However, Doug is no longer present in the organization chart, causing an error to be displayed in an organization chart rendering for Earnest and Ginny. Changing Cleo's name to Cleopatra is successful.

Figure 5A:
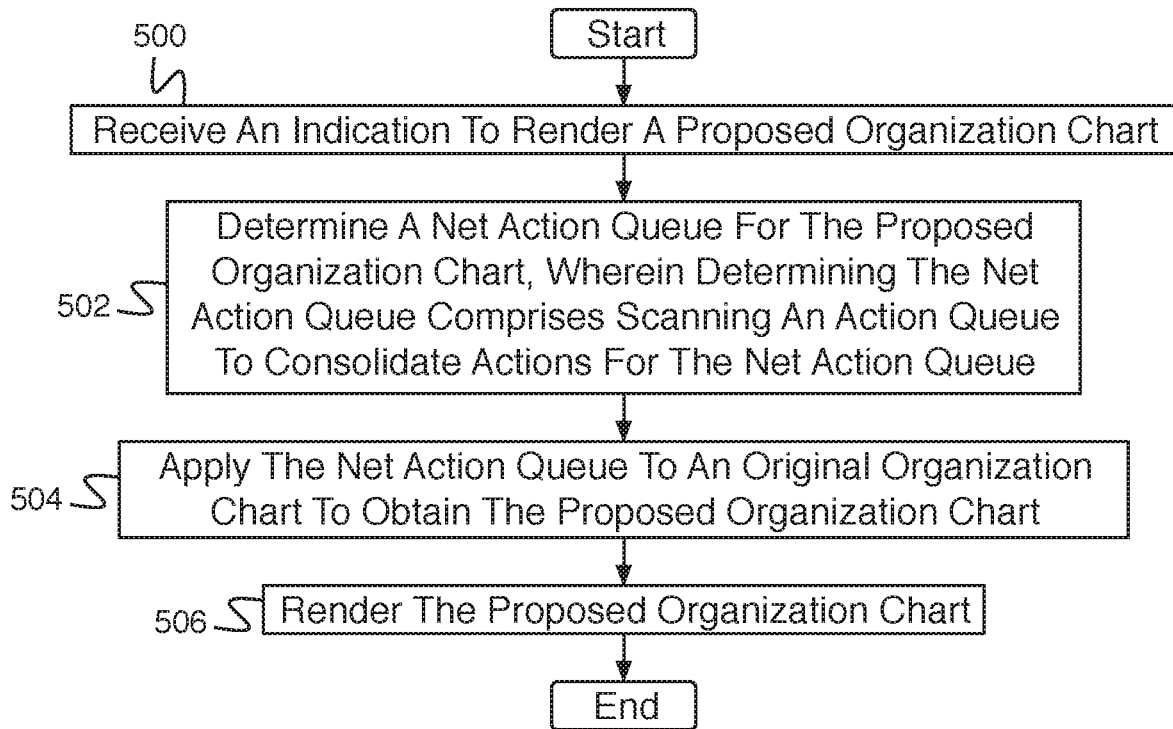
FIG. 5A is a flow diagram illustrating an embodiment of a process for a proposed organization chart.

FIG. 5A is a flow diagram illustrating an embodiment of a process for a proposed organization chart. In some embodiments, the process of FIG. 5A is executed by planning system 108 of FIG. 1. In the example shown, in 500, an indication to render a proposed organization chart is received. In 502, a net action queue is determined for the proposed organization chart, wherein determining the net action queue comprises scanning an action queue to consolidate actions for the net action queue. For example, consolidating actions for the net action queue comprises determining net changes for each entity of a subset of entities of the original organization chart. In some embodiments, determining net changes comprises processing each action of the action queue in sequence to determine the net changes. In some embodiments, determining a sequence of actions to a given entity of the hierarchy is used to ascertain a first state and a last state; create one or more net actions that indicate the net change of the given entity from the first state to the last state; and storing the one or more net actions in a net action list or net action queue. In 504, the net action queue is applied to an original organization chart to obtain the proposed organization chart. For example, the original organization chart comprises an original organization chart as indicated by organization chart 300 of FIG. 3A (e.g., a tree). In some embodiments, the original organization chart is stored by another system (e.g., by database system 106 of FIG. 1). In some embodiments, applying the net action queue to the original organization chart comprises applying the net changes to each element of the original organization chart with net changes indicated in the net action queue. In 506, the proposed organization chart is rendered. In some embodiments, during processing, the action queue, the net action queue, and the proposed organization chart are stored in a system memory.

Figure 5B:
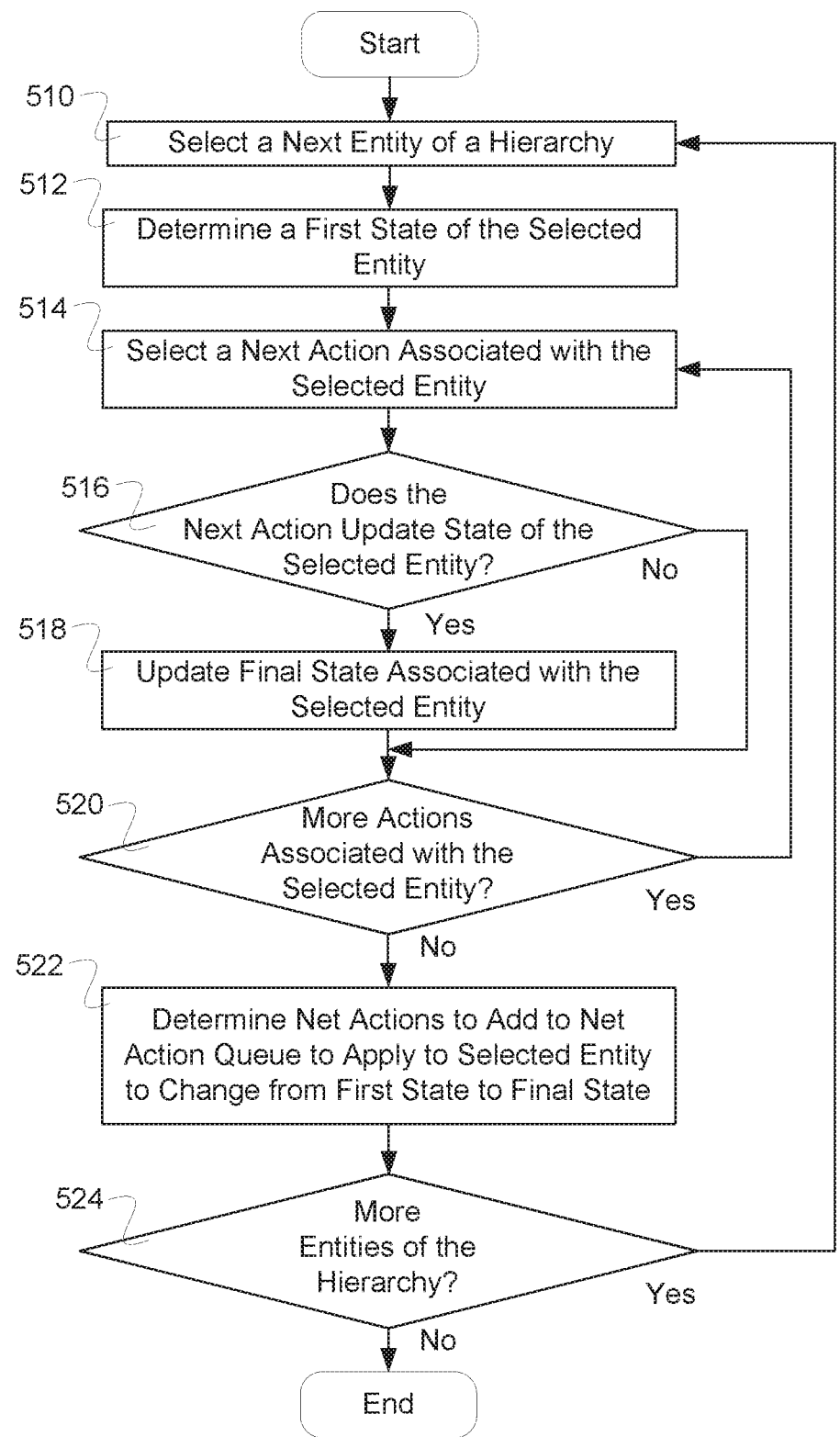
FIG. 5B is a flow diagram illustrating an embodiment of a process for a proposed organization chart.

FIG. 5B is a flow diagram illustrating an embodiment of a process for a proposed organization chart. In some embodiments, the process of FIG. 5B is used to implement 502 of FIG. 5A. In the example shown, in 510 a next entity of a hierarchy is selected. For example, an employee of an organization (e.g., as shown in an organization chart or hierarchy) is selected. In some embodiments, the next entity comprises the first entity. In 512, a first state of the selected entity is determined. For example, the state of the attributes and/or the relationships of the entity (e.g., the employee) are determined. In 514, a next action associated with the selected entity is selected. For example, an action in an action list associated with the entity is selected. In various embodiments, an action comprises adding an attribute, changing an attribute, deleting an attribute, adding a relationship, changing a relationship, deleting a relationship, or any other appropriate action. In 516, it is determined whether the next action updates the state of the selected entity. For example, it is determined whether the action changes the state of the selected entity. In response to determining that the next action updates the state of the selected entity, in 518 the final state associated with the selected entity is updated, and control passes to 520. For example, the final state associated with the selected entity is changed to include a change associated with the action. In response to determining that the next action does not update the state of the selected entity, control passes to 520. In 520, it is determined whether there are more actions associated with the selected entity. In response to determining that there are more actions associated with the selected entity, control passes to 514. In response to determining that there are not more actions associated with the selected entity, control passes to 522. In 522, net actions are determined to add to net action queue to apply to selected entity to change from first state to final state. In 524, it is determined whether there are more entities of the hierarchy. In response to determining that there are more entities of the hierarchy, control passes to 510. In response to determining that there are not more entities of the hierarchy, the process ends.

Figure 5C:
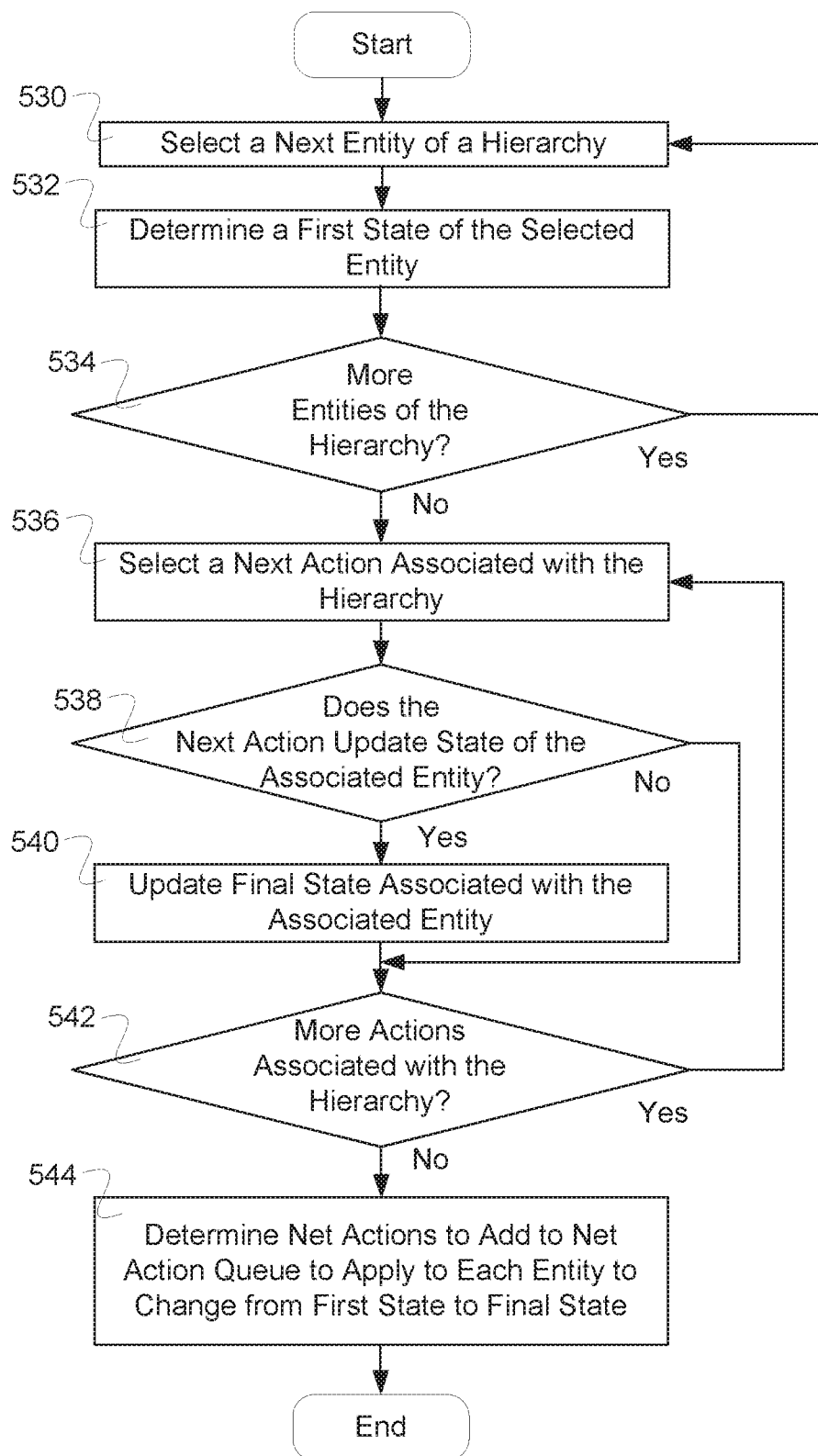
FIG. 5C is a flow diagram illustrating an embodiment of a process for a proposed organization chart.

FIG. 5C is a flow diagram illustrating an embodiment of a process for a proposed organization chart. In some embodiments, the process of FIG. 5C is used to implement 502 of FIG. 5A. In the example shown, in 530 a next entity of a hierarchy is selected. For example, an employee of an organization structure is selected. In some cases the next entity is the first entity of the hierarchy. In 532, a first state is determined of the selected entity. In 534, it is determined whether there are more entities of the hierarchy. In response to determining that there are more entities of the hierarchy, control passes to 530. In response to determining that there are not more entities of the hierarchy, control passes to 536.

In 536, a next action associated with the hierarchy is selected. In 538, it is determined whether the next action updates the state of the associated entity. In response to determining that the next action updates the state of the associated entity, in 540 the final state associated with the associated entity is updated and control passes to 542. In response to determining that the next action does not update the state of the associated entity, control passes to 542. In 542, it is determined whether there are more actions associated with the hierarchy. In response to determining that there are more actions associated with the hierarchy, control passes to 536. In response to determining that there are not more actions associated with the hierarchy, control passes to 544. In 544, net actions are determined to add to a net action queue to apply to each entity to change from the first state to the final state, and the process ends.

Figure 6:
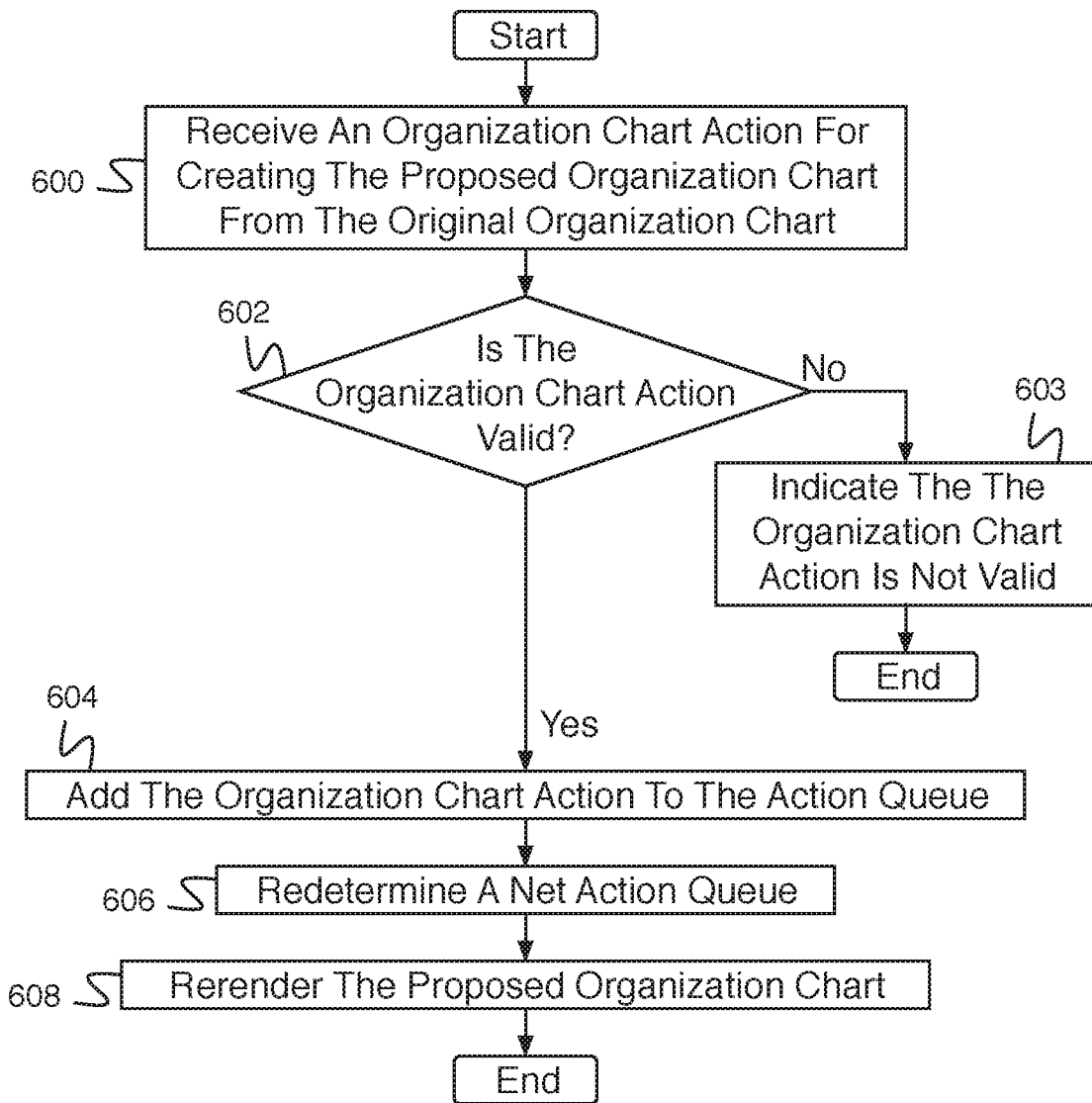
FIG. 6 is a flow diagram illustrating an embodiment of a process for receiving an action for a proposed organization chart.

FIG. 6 is a flow diagram illustrating an embodiment of a process for receiving an action for a proposed organization chart. In some embodiments, the process of FIG. 6 is executed by planning system 108 of FIG. 1. In the example shown, in 600 an organization chart action is received for creating the proposed organization chart from the original organization chart. For example, the organization chart action comprises adding an entity, removing the entity, moving the entity, renaming the entity, modifying entity content, activating the entity, deactivating the entity, or any other appropriate organization chart action. In 602, it is determined whether the organization chart action is valid. For example, an invalid action comprises deleting an entity with child entities (e.g., indicated as supervising another entity), moving an entity subordinate to an entity that does not exist, assigning superior organizations to lower organizations in the hierarchy that would create infinite loops, moving positions between organizations that have dissimilar staffing models, moving a worker into an inactive organization, moving an organization under an inactive organization, moving an unfilled position that is already closed (e.g., inactivated), moving an organization X under another organization Y when there is already a later dated move planned where X will be moved under Y (or a descendant of Y, say Z), effective date dependent move violations, etc. Note that the original database allows effective dated transactions—for example, "Move X under Z as of Jan. 1, 2021". The modeling activity for the proposed organization chart could be however being done as of an earlier date (e.g. Dec. 1, 2020). Therefore, the system needs to ensure that changes being made in the proposed organizational chart as of December 1 would need to continue to remain valid as of Jan. 1, 2021 when the change will become effective in the original database. If the system does not perform this effective date dependent validation for effective date dependent move violations, when the proposed organizational chart is executed, it will have a loop in the hierarchy structure in the original database (X>Y> . . . >Z>X) when the date rolls over to January 1 which will be a corruption of data. To prevent this from happening, when the user tries to move Y under X the system will disallow the action and present the user with an error.

In some embodiments, determining whether the organization chart action is valid comprises the system checking against a tracked update proposed state of the organization chart. For example, the system identifies the state of the original database as D, and the state represented initially by the net action queue is also D (since no actions have been performed yet). Then:

After a user performs action A1, the system validates A1 by checking "Is A1 valid to execute as of state D" and if yes, the system allows A1. The state tracked by the net action queue now becomes D+A1.

After the user performs action A2, and the system validates A2 by checking "Is A2 valid to execute as of state D+A1" and if yes, the system allows A2, taking the state tracked by the net action queue to D+A1+A2.

Similarly, action A3 is validated by checking "Is A3 valid to execute as of state D+A1+A2" and so on.

In contrast, most other system software is written to validate transactions based on the state of the original database (i.e., state D and once executed) and to advance the state of the original database to a new state D*. In the disclosed system however, every successful transaction takes the state of the proposed organizational chart further away from state D without actually updating it, and need to be validated as such. This is enabled by the use of the system's net action queue and represented in 606 ensuring that the output of 602 is correct.

In response to determining that the organization chart action is not valid, in 603 it is indicated that the organization chart action is not valid, and the process ends. For example, a user is notified that the action to the hierarchy is not valid and needs to be reentered. In some embodiments, the indication comprises indicating that the action comprises an error and cannot be performed. In response to determining that the organization chart action is valid, control passes to 604. For example, determining whether the organization chart action is valid comprises validating the organization chart action. In 604, the organization chart action is added to the action queue. In 606, a net action queue is redetermined. For example, the net action queue comprises the net action queue determined in 502 of FIG. 5. In 608, the proposed organization chart is rerendered. For example, the proposed organization chart is rerendered in order to reflect the change indicated by the organization chart action received in 600.

Figure 7A:
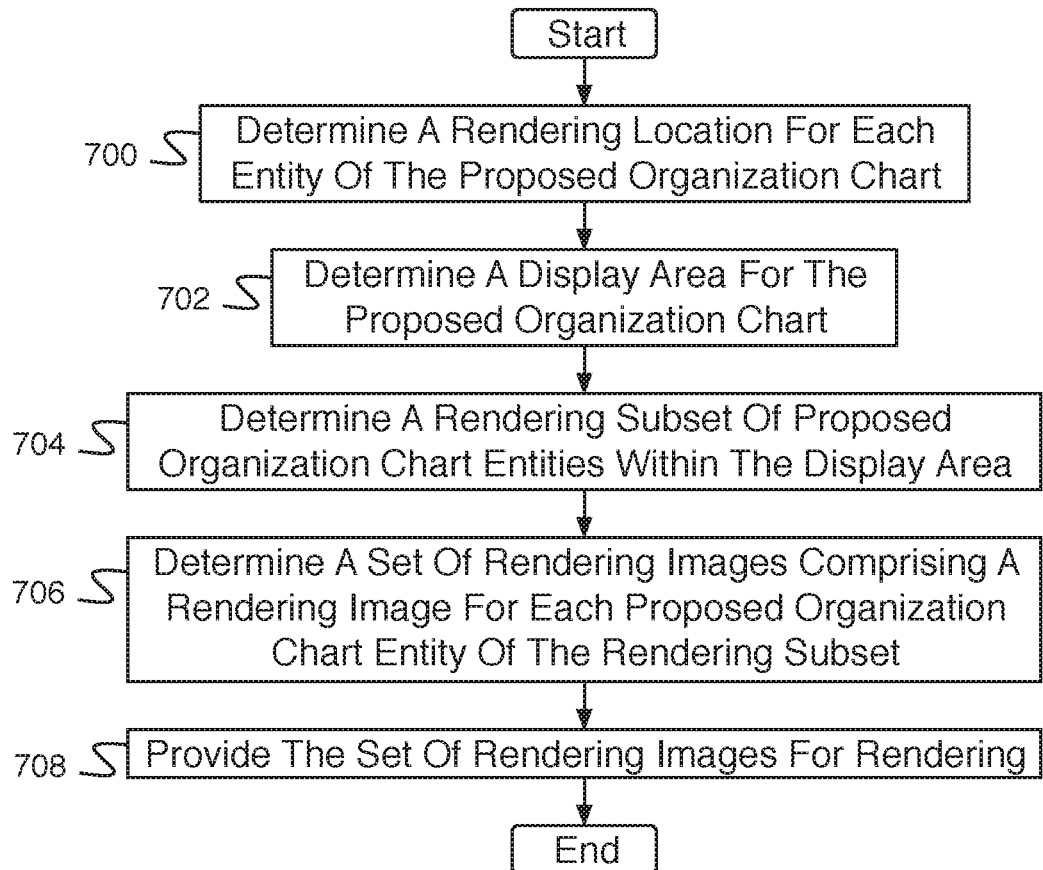
FIG. 7A is a flow diagram illustrating an embodiment of a process for rendering a proposed organization chart.

FIG. 7A is a flow diagram illustrating an embodiment of a process for rendering a proposed organization chart. In some embodiments, the process of FIG. 7A implements 506 of FIG. 5A. In the example shown, in 700, a rendering location for each entity of the proposed organization chart is determined. In 702, a display area for the proposed organization chart is determined. In 704, a rendering subset of proposed organization chart entities within the display area is determined. For example, the rendering subset of the proposed organization chart entities within the display area comprises those entities within a display area. In some embodiments, the entities within the display area are determined by: selecting an entity; determining whether the selected entity is within the display area; in response to the selected entity being within the display area, add the selected entity to the rendering subset and determine whether there are more entities; in response to the selected entity not being within the display area, do not add the selected entity to the rendering subset and determine whether there are more entities; in response to determining that there are more entities, selecting a next entity and looping through the process again; in response to determining that there are no more entities, the process ends. In 706, a set of rendering images comprising a rendering image for each proposed organization chart entity of the rendering subset is determined. In 708, the set of rendering images is provided for rendering.

Figure 7B:
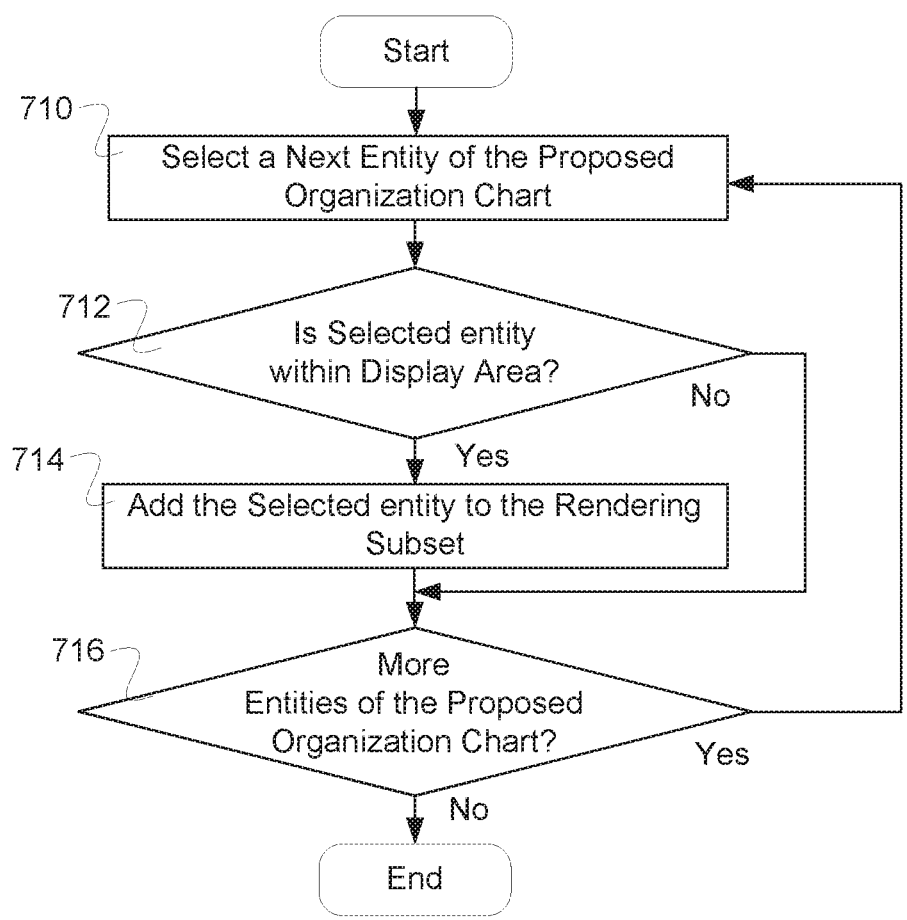
FIG. 7B is a flow diagram illustrating an embodiment of a process for rendering a proposed organization chart.

FIG. 7B is a flow diagram illustrating an embodiment of a process for rendering a proposed organization chart. In some embodiments, the process of FIG. 7B is used to execute 704 of FIG. 7A. In the example shown, in 710 a next entity of the proposed organization chart is selected. In some cases, the next entity is the first entity. In 712, it is determined whether the selected entity is within the display area. In response to the selected entity being within the display area, in 714 the selected entity is added to the rendering subset and control passes to 716. In response to the selected entity not being within the display area, control passes to 716. For example, the selected entity is not added to the rendering subset and it is determined whether there are more entities. In 716, it is determined whether there are more entities of the proposed organization chart. In response to determining that there are more entities, control passes to 710. In response to determining that there are no more entities, the process ends.

Figure 8:
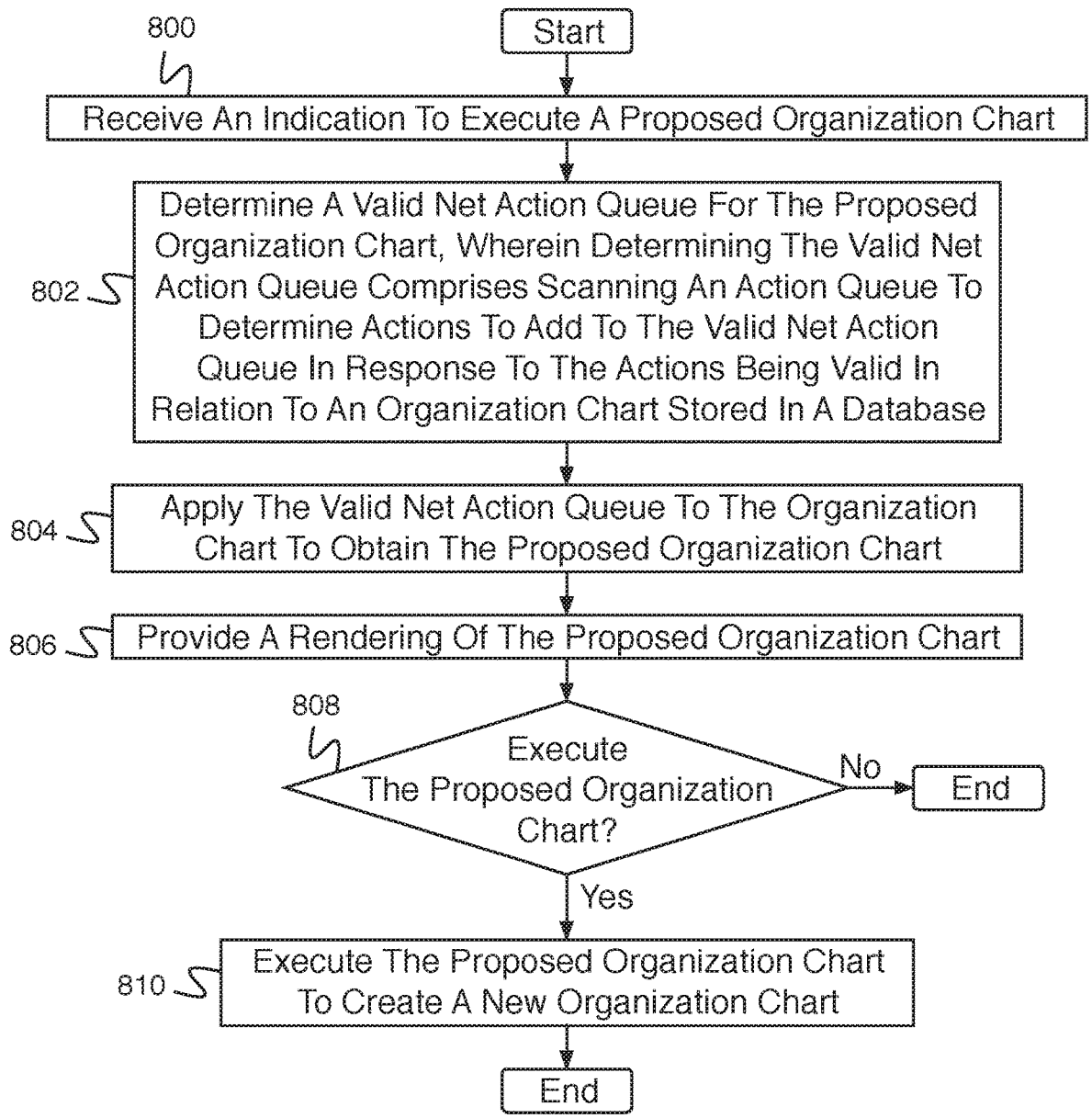
FIG. 8 is a flow diagram illustrating an embodiment of a process for executing a proposed organization chart.

FIG. 8 is a flow diagram illustrating an embodiment of a process for executing a proposed organization chart. In some embodiments, the process of FIG. 8 is executed by planning system 108 of FIG. 1. In the example shown, in 800, an indication to execute a proposed organization chart is received. For example, it is indicated that a proposed organization chart is to be adopted in the system. In 802, a valid net action queue is determine for the proposed organization chart, wherein determining the valid net action queue comprises scanning an action queue to determine actions to add to the valid net action queue in response to the actions being valid in relation to an organization chart stored in a database. For example, 804, the valid net action queue is applied to the organization chart to obtain the proposed organization chart. In 806, a rendering of the proposed organization chart is provided. For example, providing a rendering of the proposed organization chart comprises providing a portion of the proposed organization chart for display. In 808, it is determined whether to execute the proposed organization chart. In some embodiments, it is determined to execute the proposed organization chart in response to receiving a go indication to proceed with executing the proposed organization chart and it is determined to end prior to executing the proposed organization chart in response to receiving a no-go indication to not proceed with executing the proposed organization chart after the rendering of the proposed organization chart. In the event it is determined not to execute the proposed organization chart, the process ends. In the event it is determined to execute the proposed organization chart, control passes to 810. In 810, the proposed organization chart is executed to create a new organization chart. In some embodiments, during processing, the valid net action queue, the new organization chart, and an error list are stored in a system memory.

Figure 9:
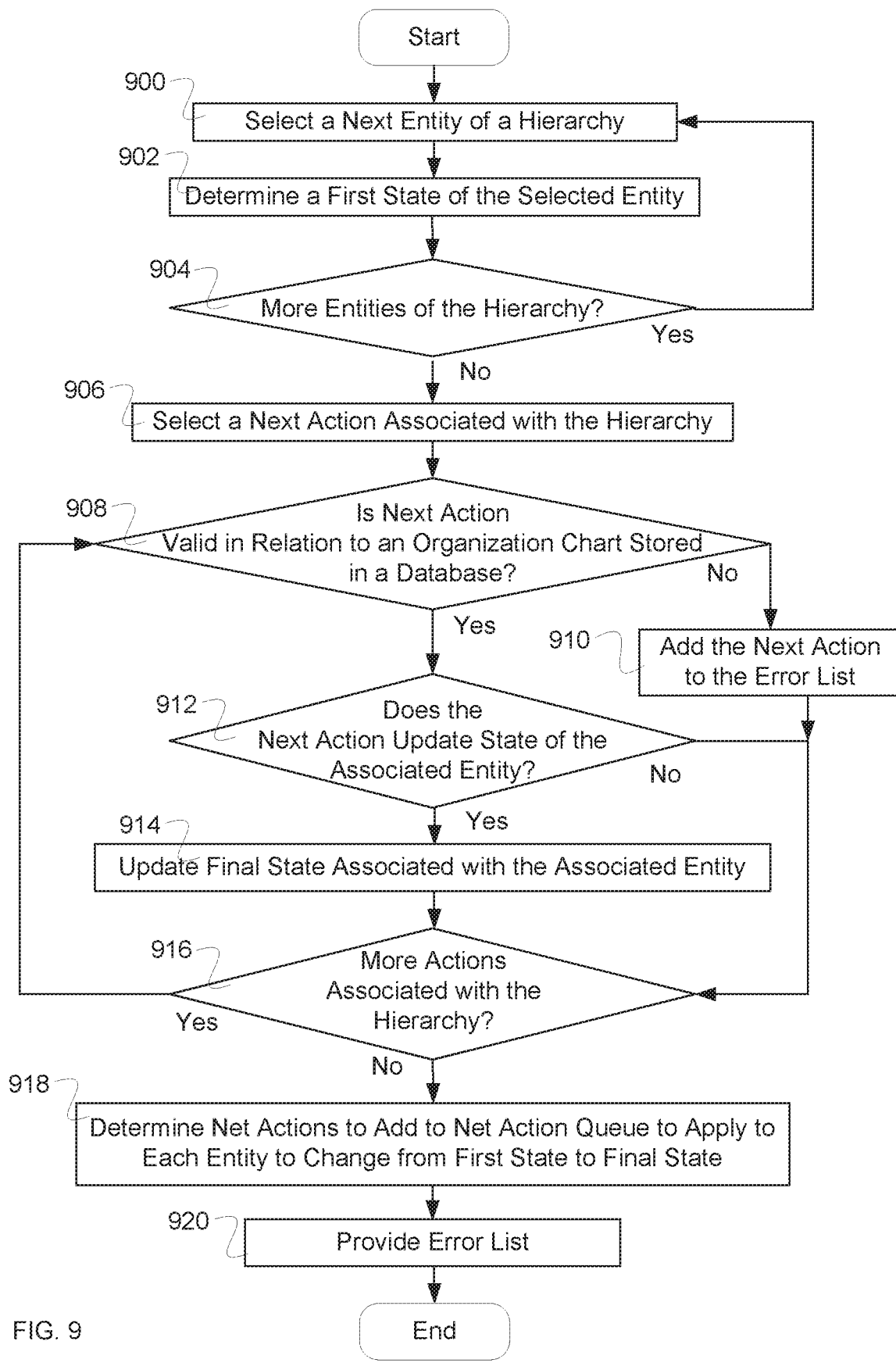
FIG. 9 is a flow diagram illustrating an embodiment of a process for determining a valid net action queue and an error list.

FIG. 9 is a flow diagram illustrating an embodiment of a process for determining a valid net action queue and an error list. In some embodiments, the process of FIG. 9 implements 802 of FIG. 8. In the example shown, in 900, a next entity of a hierarchy is selected. For example, an employee of an organization structure is selected. In some cases the next entity is the first entity of the hierarchy. In 902, a first state is determined of the selected entity. In 904, it is determined whether there are more entities of the hierarchy. In response to determining that there are more entities of the hierarchy, control passes to 900. In response to determining that there are not more entities of the hierarchy, control passes to 906.

In 906, a next action associated with the hierarchy is selected. In 908, it is determined whether the next action is valid in relation to an organization chart stored in a database. In response to determining that the next action is not valid in relation to an organization chart stored in a database, control passes to 910. In 910 the next action is added to an error list and control passes to 916. In response to determining that the next action is valid in relation to an organization chart stored in a database, control passes to 912. In 912, it is determined whether the next action updates the state of the associated entity. In response to determining that the next action updates the state of the associated entity, in 914 the final state associated with the associated entity is updated and control passes to 916. In response to determining that the next action does not update the state of the associated entity, control passes to 916. In 916, it is determined whether there are more actions associated with the hierarchy. In response to determining that there are more actions associated with the hierarchy, control passes to 908. In response to determining that there are not more actions associated with the hierarchy, control passes to 918. In 918, net actions are determined to add to a net action queue to apply to each entity to change from the first state to the final state. In 920, the error list is provided, and the process ends. For example, the error list is provided to a user from whom the indication to execute a proposed organization chart is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
an interface configured to:
  receive an indication to execute a proposed organization chart;
a processor configured to:
  determine a valid net action queue for the proposed organization chart, wherein determining the valid net action queue comprises scanning an action queue to determine a minimum number of actions to add to the valid net action queue in response to the actions being valid in relation to an organization chart stored in a database, wherein the determining of the valid net action queue for the proposed organization chart comprises to:
  determine whether a next action is an invalid action in relation to the organization chart, wherein the invalid action includes one or more of the following: a) moving positions between organizations that have different staffing models, b) moving a worker into an inactive organization, c) moving an organization under an inactive organization, d) moving an unfilled position that is already closed or inactivated, e) moving a first organization under a second organization at a first date when the first organization will be moved under the second organization or a descendant of the second organization at a second date, the second data being later than the first date, and/or f) an effective date dependent move violation, wherein the effective date dependent move violation includes the next action being performed at a date after the proposed organization chart is to be executed; and
  in response to a determination that the next action is invalid in relation to the organization chart, add the next action to an error list;
  apply the valid net action queue to the organization chart to obtain the proposed organization chart; and
  execute the proposed organization chart to create a new organization chart; and
a memory coupled to the processor and configured to provide the processor with instructions.

2. The system of claim 1, wherein the interface is further configured to receive an organization chart action for creating the proposed organization chart from the organization chart stored in the database.

3. The system of claim 2, wherein an organization chart action is used to determine a net action for the net valid action queue.

4. The system of claim 2, wherein the organization chart action comprises adding an entity, removing the entity, moving the entity, renaming the entity, modifying entity content, activating the entity, or deactivating the entity.

5. The system of claim 1, wherein the error list is provided to a user from whom the indication was received.

6. The system of claim 1, wherein the action is invalid based at least in part on a change of a state of the organization chart stored in the database from an original organization chart stored in the database.

7. The system of claim 6, wherein the original organization chart corresponds to a state of the organization chart at a time when a first action of an action queue was received.

8. The system of claim 1, wherein the processor is further configured to provide a rendering of the proposed organization chart prior to executing the proposed organization chart.

9. The system of claim 8, wherein providing the rendering comprises providing a portion of the proposed organization chart for display.

10. The system of claim 8, wherein the processor is further configured to proceed with executing the proposed organization chart in response to receiving a go indication to proceed with executing the proposed organization chart after the rendering of the proposed organization chart.

11. The system of claim 8, wherein the processor is further configured to end prior to executing the proposed organization chart in response to receiving a no-go indication to not proceed with executing the proposed organization chart after the rendering of the proposed organization chart.

12. The system of claim 1, wherein executing the proposed organization chart comprises executing the valid net action queue to the organization chart stored in the database.

13. The system of claim 1, wherein the valid net action queue is stored in the memory.

14. The system of claim 1, wherein the proposed organization chart is stored in the memory.

15. The system of claim 1, wherein the new organization chart is stored in the database.

16. The system of claim 1, wherein an error list is stored in the memory.

17. The system of claim 1, wherein the invalid action includes three or more of the following: a) moving positions between organizations that have dissimilar staffing models, b) moving a worker into an inactive organization, c) moving an organization under an inactive organization, d) moving an unfilled position that is already closed or inactivated, e) moving a first organization under a second organization at a first date when the first organization will be moved under the second organization or a descendant of the second organization at a second date, the second data being later than the first date, and/or f) an effective date dependent move violation, wherein the effective date dependent move violation includes the next action being performed at a date after the proposed organization chart is to be executed.

18. The system of claim 1, wherein the invalid action includes the following: a) moving positions between organizations that have dissimilar staffing models, b) moving a worker into an inactive organization, c) moving an organization under an inactive organization, d) moving an unfilled position that is already closed or inactivated, e) moving a first organization under a second organization at a first date when the first organization will be moved under the second organization or a descendant of the second organization at a second date, the second data being later than the first date, and f) an effective date dependent move violation, wherein the effective date dependent move violation includes the next action being performed at a date after the proposed organization chart is to be executed.

19. A method, comprising:
  receiving an indication to execute a proposed organization chart;
  determining, using a processor, a valid net action queue for the proposed organization chart, wherein determining the valid net action queue comprises scanning an action queue to determine a minimum number of actions to add to the valid net action queue in response to the actions being valid in relation to an organizational chart stored in a database, wherein the determining of the valid net action queue for the proposed organization chart comprises:
    determining whether a next action is an invalid action in relation to the organization chart, wherein the invalid action includes one or more of the following: a) moving positions between organizations that have different staffing models, b) moving a worker into an inactive organization, c) moving an organization under an inactive organization, d) moving an unfilled position that is already closed or inactivated, e) moving a first organization under a second organization at a first date when the first organization will be moved under the second organization or a descendant of the second organization at a second date, the second data being later than the first date, and/or f) an effective date dependent move violation, wherein the effective date dependent move violation includes the next action being performed at a date after the proposed organization chart is to be executed; and in response to a determination that the next action is invalid in relation to the organization chart, adding the next action to an error list;

applying the valid net action queue to the organization chart to obtain the proposed organization chart; and executing the proposed organization chart to create a new organization chart.

20. A computer program product embodied in a non-transitory computer readable medium and comprising computer instructions for:

receiving an indication to execute a proposed organization chart;

determining, using a processor, a valid net action queue for the proposed organization chart, wherein determining the valid net action queue comprises scanning an action queue to determine a minimum number of actions to add to the valid net action queue in response to the actions being valid in relation to an organizational chart stored in a database, wherein the determining of the valid net action queue for the proposed organization chart comprises:

determining whether a next action is an invalid action in relation to the organization chart, wherein the invalid action includes one or more of the following: a) moving positions between organizations that have different staffing models, b) moving a worker into an inactive organization, c) moving an organization under an inactive organization, d) moving an unfilled position that is already closed or inactivated, e) moving a first organization under a second organization at a first date when the first organization will be moved under the second organization or a descendant of the second organization at a second date, the second data being later than the first date, and/or f) an effective date dependent move violation, wherein the effective date dependent move violation includes the next action being performed at a date after the proposed organization chart is to be executed; and in response to a determination that the next action is invalid in relation to the organization chart, adding the next action to an error list;

applying the valid net action queue to the organization chart to obtain the proposed organization chart; and executing the proposed organization chart to create a new organization chart.

\* \* \* \* \*